US010640675B2

(12) United States Patent
Schoneveld et al.

(10) Patent No.: US 10,640,675 B2
(45) Date of Patent: May 5, 2020

(54) HYBRID POLYMER COATING FOR PETROUS OR CERAMIC SUBSTRATES, PETROUS OR CERAMIC SUBSTRATE, AND OBTAINING METHOD

(71) Applicant: SILICALIA, SL, Valencia (ES)

(72) Inventors: Erik Schoneveld, Valencia (ES); Francisco Sanchis Brines, Valencia (ES); Alberto Ortola, Valencia (ES); Bernardo Sanchez Sevilla, Almeria (ES)

(73) Assignee: COMPACSTONE USA, INC., Miami, FL (US)

(*) Notice: Subject to any disclaimer, the term of this patent is extended or adjusted under 35 U.S.C. 154(b) by 300 days.

(21) Appl. No.: 15/357,457

(22) Filed: Nov. 21, 2016

(65) Prior Publication Data
US 2017/0066690 A1 Mar. 9, 2017

Related U.S. Application Data

(63) Continuation-in-part of application No. 14/232,415, filed as application No. PCT/IB2012/001055 on May 31, 2012, now abandoned.

(30) Foreign Application Priority Data

Jul. 18, 2011 (EP) ..................... 11380058

(51) Int. Cl.
*C09D 167/00* (2006.01)
*C04B 26/02* (2006.01)
(Continued)

(52) U.S. Cl.
CPC ............ *C09D 167/00* (2013.01); *C04B 26/02* (2013.01); *C04B 2111/00129* (2013.01);
(Continued)

(58) Field of Classification Search
CPC combination set(s) only.
See application file for complete search history.

(56) References Cited

U.S. PATENT DOCUMENTS

| 4,177,789 A | 12/1979 | Marocco |
| 4,640,850 A | 2/1987 | Marocco |

(Continued)

FOREIGN PATENT DOCUMENTS

| EP | 0 790 222 A1 | 8/1997 |
| EP | 0 799 949 A1 | 10/1997 |

(Continued)

OTHER PUBLICATIONS

Web page entitled "Degassing Materials" downloaded from http://www.crosslinktech.com/support/tips-and-tricks/degassing-materials.html.

(Continued)

*Primary Examiner* — Elizabeth A Robinson
*Assistant Examiner* — Nicole T Gugliotta
(74) *Attorney, Agent, or Firm* — RatnerPrestia (57) ABSTRACT

A coating having a thickness between 0.1 and 2 mm is obtained from a mixture with the following composition: 10-25% by weight of micronized powder; 40-60% by weight of inorganic gravels of petrographic origin of sizes comprised between 0.063-2 mm; 10-40% by weight of a polymerisable base resin selected from polyurethane, polyester, epoxy or acrylic, with additives, and optionally pigments. The proportion of the mentioned gravel and micronized powder of the coating being up to 90% in an inner most area of interphase between coating and surface of the petrous substrate, covering one third of the thickness of the coating. The method comprises depositing the mentioned mixture on the substrate and vibrating the assembly, and (Continued)

subsequently proceeding to a step of curing and subsequent mechanical finishing of the surface.

5 Claims, 4 Drawing Sheets

(51) Int. Cl.
 *C04B 111/00* (2006.01)
 *C04B 111/54* (2006.01)
(52) U.S. Cl.
 CPC .............. *C04B 2111/00405* (2013.01); *C04B 2111/00482* (2013.01); *C04B 2111/00612* (2013.01); *C04B 2111/54* (2013.01)

(56) References Cited

U.S. PATENT DOCUMENTS

| 6,886,304 | B1 | 5/2005 | Godi et al. | |
|---|---|---|---|---|
| 2003/0065082 | A1 | 4/2003 | Blanken et al. | |
| 2006/0151920 | A1* | 7/2006 | Lawrence | B22F 7/02 |
| | | | | 264/414 |
| 2011/0076485 | A1 | 3/2011 | Yakulis et al. | |
| 2012/0328875 | A1 | 12/2012 | Schoneveld et al. | |

FOREIGN PATENT DOCUMENTS

| EP | 1 375 130 A1 | 1/2004 |
|---|---|---|
| FR | 2 868 099 | 9/2005 |
| GB | 2 224 283 A | 5/1990 |
| JP | 08-156216 | 6/1996 |
| JP | 2-811951 | 10/1998 |
| JP | 11-138703 | 5/1999 |
| WO | WO 01/14133 A1 | 3/2001 |
| WO | WO 2004/035502 A2 | 4/2004 |
| WO | WO 2011/028125 A1 | 3/2011 |

OTHER PUBLICATIONS

Jalay T. Joshi; A Review on Micronization Techniques, Journal of Pharmaceutical Science and Technology, vol. 3(7), 2011, pp. 651-681.
K. Sambamurthy, "Pharmaceutical Engineering," published by New Age International (p) Ltd, 1998, Chapter 15, Size Reduction, p. 329.
Gunter Buxbaum, "Industrial Inorganic Pigments," published by Wiley VCH, Weinheim, Federal Republic of Germany, 1998, p. 136.
International Search Report issued in PCT/IB2012/001055 dated Jul. 25, 2012 (2 pages).
Dennis R. Dinger, Rheology of Ceramists, $2^{nd}$ Edition, Copyright 2010, p. 23-36.

* cited by examiner

HYBRID POLYMER COATING FOR PETROUS OR CERAMIC SUBSTRATES, PETROUS OR CERAMIC SUBSTRATE, AND OBTAINING METHOD

CROSS-REFERENCE TO RELATED APPLICATIONS

This application is a Continuation-In-Part of U.S. application Ser. No. 14/232,415, filed Mar. 27, 2014, which is the U.S. National Phase Application of PCT/IB2012/001055, filed May 31, 2012, which claims priority to European Patent Application No. 11380058.5, filed Jul. 18, 2011, the contents of such applications being incorporated by reference herein in their entirety for all purposes.

FIELD OF THE INVENTION

The present invention relates, in a first aspect, to a coating which provides a very thin layer (thickness being at most of the order of 2 mm and generally considerably less) applicable to natural or artificial petrous substrates, particularly to marble agglomerate, as well as to ceramic substrates on which the coating is firmly adhered to.

DISCUSSION OF THE RELATED ART

The surfaces of marble agglomerate comprise calcareous mineral loads having as main drawbacks a low resistance to scratching and poor chemical resistance against acids. These properties are determined by the mineral used as load which on the other hand, since the marble is not very abrasive, provides the advantage of being able to use a manufacturing process with high productivity if compared with the manufacturing of quartz boards and tiles.

The proposed coating provides a hardness and resistance to chemical attack comparable to quartz, allowing using substrates of reduced thickness of the order of 6 to 12 mm, being able to use materials recycled from the natural stone cutting production process for the constitution of said substrate as well as the coating, increasing the recyclable material content of the petrous agglomerate and of the coating.

In a second aspect the invention refers to a petrous or ceramic substrate provided with a hybrid polymer coating according to the principles of this invention.

Lastly, the invention also refers to a method for obtaining the mentioned hybrid polymer coating which is carried out on a petrous or ceramic substrate and which renders a product protected by said coating.

EP 790222 describes a stone agglomerate comprising a first component with fine inorganic particles and a second component with micro-particles, wherein said fine particles or aggregates thereof are transparent and are coated by a layer of inorganic or organic material having a thickness comprised between 5 and 50 microns such that said layer is partially fragmented and exposes the component on the surface producing an accentuated reflection of the light.

U.S. Pat. No. 4,640,850 describes a composite slab incorporating a sheet of marble or petrous coated on its visible face by a sheet of transparent glass. This patent refers to the preceding U.S. Pat. No. 4,177,789 describing a method for obtaining marble boards having thicknesses less than 10 mm and generally up to 4 mm, which are reinforced on their not visible face by means of a glass fiber covering, indicating that the visible face of the slab is provided with some type of reinforcement. EP 799949 describes a thin natural stone element joined by a transparent polyester resin to a glass plate support. EP 1375130 describes a composite slab with a multilayered coating based on overlapping glass plates.

Patent WO 0114133 describes a method for obtaining a multilayer composite slab with a sandwich type structure with an intermediate layer of expanded light material comprised between an upper layer of stone agglomerate obtained by mixing crushed stone, powder and a binder in required proportions, introducing the mixture in a mold and performing a process of vibro compression in said mold and optionally a lower layer of agglomerate with similar characteristics.

Patent JP 11138703 describes a multilayer material for laminating having flexion and impact high performances and incorporating a visible surface of wood agglomerate, calcium carbonate, hollow crystal balls, talc, etc., comprising flexible middle support layers.

Patent FR 2868099 describes a decorative panel for panels or ceilings with a multi-layer surface of a thermoplastic composite with load mineral, fibers or other particles attached to an extruded polystyrene base.

GB 2224283 describes a method for obtaining artificial petrous stone for flooring and facades comprising a step of crushing marble material into particles of approximately 7 mm, a step of mixing said material with other additional materials including silica sand subjected to heating, and at least one polymerisable resin, a step of molding the mixture thus obtained with a combined action of vibration and compression under vacuum and a step of polymerizing the resin.

JP 8156216 refers to an artificial petrous product with a surface provided with a layer containing marble particles comprising a mixture of a non saturated polyester resin, calcium carbonate powder and a curing agent, obtained in molding.

JP 2811951 describes an artificial marble with a granular pattern obtained by laminating three classes of layers with resins incorporating different components such as crushed stones, ceramic, fibers, glass, etc.

SUMMARY OF THE INVENTION

Unlike the mentioned prior art, the present invention proposes:
 a hybrid low viscosity polymer coating (in a condition prior to curing) different from those described in terms of the fact that it comprises several components of siliceous origin, particularly micronized powder and gravels of different grading bound by a polymerisable resin;
 a distribution of the components of the coating, such that a greater concentration of inorganic loads of at least 75% is obtained in the areas closest to the coating-substrate interphase, thus allowing, with a very thin layer of the order of 0.5 mm, the possibility of obtaining an efficient protection of the substrate and meeting the mechanical and chemical requirements of the substrate+coating assembly in the same or similar extent than those of a quartz or granite.

The coating of this invention is not applied in molding, but directly on the substrate by means of an applicator with retention of said coating until the complete curing thereof.

The main objectives of the invention are described below:
 a) to obtain products (substrate incorporating the coating) with a surface having a hardness and chemical resistance comparable to quartz having similar aspect but at a lower production cost;

b) to apply a thinnest possible surface layer (thickness <1 mm);

c) enabling the use of defective or damaged slabs of marble agglomerate by applying the mentioned coating as a finish;

enabling to include slurries and cuttings from a marble agglomerate treatment plant or other types of waste coming from demolitions, home renovations or wastes from other industries in the composition of the base substrate or support.

BRIEF DESCRIPTION OF THE DRAWINGS

The invention is best understood from the following detailed description when read in connection with the accompanying drawings. Included in the drawings are the following figures.

DETAILED DESCRIPTION OF CERTAIN EMBODIMENTS OF THE INVENTION

The hybrid polymer coating of this invention, which can be applied to petrous or ceramic substrates, is a micro coating formed by a mixture of micronized powder and gravels of silica, quartz and/or glass of different agglomerate grading by means of a heat stable polymer and/or polymerisable thermoplastic and which enable using a substrate or base board of minimum thicknesses (4-6 mm) on which the mentioned coating that firmly adheres to the same is applied.

In greater detail, the invention provides a hybrid polymer coating for petrous or ceramic substrates, providing a very thin surface layer (thickness of the coating comprised between 0.1 and 2 mm and preferably less than 1 mm) firmly adhered to the substrate obtained by steps of preparing a mixture of micronized powder, one or more gravels, resin selected from polyurethane, polyester, epoxy or acrylic, catalyst and pigments, subjected to stirring, subsequent curing (with the addition or generation of heat, for example by microwaves) and final polishing of the coating consolidated on the substrate to smooth and normalize the surface.

The coating which is applied on the finished product (board or marble tile or other artificial petrous substrate) is characterized by comprising a mixture with the following composition:

10-25% by weight of micronized powder functioning as a cement, containing inorganic loads mainly of petrographic origin;

40-60% by weight of inorganic load gravels of petrous origin comprising quartz, silica, silica sand, glass, recycled mirrors, silicon, etc., of sizes comprised between 0.063-2 mm;

10-40% by weight of a base resin selected from polyurethane, polyester, epoxy or acrylic; and approximately 5% by weight of pigments and other additives for said resin including a catalyst.

In any case, the proportion of resin will be of at least 10-30%.

The addition of pigments of the order of 2% by weight must be understood as optional depending on the characteristics of the natural or artificial petrous substrate to which the coating would be applied.

Furthermore, the fact that it can reach a proportion of the mentioned gravel and micronized powder of the coating of up to 90% in a first inner most area (⅓ of the thickness), corresponding to the interphase between coating and surface of the petrous or ceramic substrate, of the order of 1-15% close to the visible surface and 20-50% in a middle area, the semi-finished (i.e., non-polished) coating of this invention is distinctive considering that the same is divided into three layers of the same thickness.

In a possible embodiment of the invention the following proportion of gravel and micronized powder could be obtained:

lower third of the coating: between 55%-90%
middle third of the coating: between 16%-60%;
Upper third of the coating: between 1%-15%.

According to another possible embodiment the proportions of gravel and micronized powder would be as follows:

lower third of the coating: between 70%-95%
middle third of the coating: between 10%-70%;
upper third of the coating: between 1%-30%.

The visible surface of the coating is finished by a mechanical treatment selected from polishing with abrasives, polishing with brushes or sand blasting and/or by a chemical treatment of acid etching such that a visible surface in which first layer has been removed from the area with less gravel concentration and with more resin concentration is obtained for obtaining a final product with a very high gravel and very low resin concentration. The process of polishing further removes any particle of gravel protruding from the mixture. This step of treatment also allows working with gravels of different grading and diameters close to diameters of the thickness of the coating or final thin layer obtained (i.e., gravel sizes of 1.2 mm, for example, for a coating of 0.8 mm), since the protruding parts which could remain will be removed by polishing or equivalent mechanical treatment. Thus a hardness of the surface layer greater than 5 Mohs is obtained.

According to a preferred embodiment the mentioned mixture comprises gravels of different nature and grading.

The invention also relates to a board or petrous or ceramic substrate provided with a coating like the one mentioned and to a method for obtaining it.

The mentioned method comprises the following steps preparing a base mixture comprising a first gravel, for example of quartz, silica, silica sand, glass, or mirror of sizes comprised between 0.1-2 mm and micronized powder with inorganic loads of petrographic origin in a mixer;

stirring the mentioned mixture in said mixer;

preparing a base resin selected from polyurethane, polyester, epoxy or acrylic;

adding said resin to the mentioned mixture in said mixer, with a catalyst, additives and optionally pigments, and subsequent stirring;

creating a vacuum inside said mixer;

applying the mixture obtained on the substrate; and vibrating the substrate with the mixture applied on top on a vibration table and retaining the mixture on the substrate; and controlled supplying of thermal energy for curing the mixture retained on the substrate until the curing thereof.

Other features of the invention will be seen in view of the following description of several examples of application given by way of non-limiting illustrative example according to the following detail.

DETAILED DESCRIPTION OF THE INVENTION

The coating of the invention establishes, as a first requirement, a preferred thickness of the order of 0.5 mm (with a maximum of 2 mm) and the use of gravels of quartz or silica sand with a grain size comprised in the range of 0.1-0.6 mm in said preferred example, although grain sizes of 0.063 onwards has been provided.

This coating comprises, according to different tests performed the following main components:

1. Micronized powder of silica sand, quartz and/or glass functioning as a cement.
2. Gravels of quartz, glass and/or silica sand of different sizes which will confer mechanical strength to the coating
3. Polymerisable resin of polyurethane, polyester, epoxy or acrylic as a binder. In various embodiments of the invention, the polymerisable resin has a viscosity of 250 to 500 mPas, preferably 275 to 350 mPas (as measured at 23° C. using a Brookfield LVT viscometer, spindle 2, 30 rpm).
4. Additives for said resin comprising air release agents, adhesion promoters, UV absorbers, stabilizers, moistening agents to reduce viscosity (a boric acid ester solution, for example), antistatic agents, water repellents (preferably using silanes and siloxanes), self cleaning agents (using e.g., fluorocarbonated polymers), and natural and/or synthetic fibers.
5. Pigments (optional)

The selection of binder or resin used depends on the substrate to which the coating must be firmly adhered, and further determines:

the amount of load admitted in the formulation of the coating (final viscosity of the casting) and consequently the metering equipment;

the useful time for handling-maneuverability of the casting;

the polymerization time and therefore the curing system;

chemical properties, resistance to ageing, etc.

The invention proposes a hybrid polymer coating for petrous or ceramic substrates in the form of a very thin (of a thickness comprised between 0.1 and 2 mm and, preferably between 0.1 and 0.7 mm) surface layer which is arranged and is firmly adhered to the substrate, comprising a mixture of the mentioned components with the following composition:

10-25% by weight of micronized powder of siliceous materials comprising aluminium oxides, quartz and/or glass, or calcareous materials, with inorganic loads of petrographic origin;

40-60% by weight of inorganic load gravels of petrous origin and/or comprising quartz, silica, silica sand, glass, recycled mirrors, silicon, etc., of sizes comprised between 0.063-2 mm;

10-40% by weight of a polymerisable base resin selected from polyurethane, polyester, epoxy or acrylic;

approximately 3% by weight of additives particularly catalysts for said resin;

proportion of the mentioned gravel and micronized powder of the coating of up to 90% (and generally comprised between 55% and 85%) in one lower third or inner most area corresponding to the interphase between the coating and surface of the petrous or ceramic substrate, of the order of 1-15% in the upper third close to the visible surface and of 15-60% in one middle third between both inner area and area adjacent to the surface.

Depending on the purpose or final location of the elements, for example, tiles obtained from the petrous board with coating, the mentioned mixture will further include up to 2% by weight of pigments.

The mentioned mixture will comprise particularly gravels of different nature and grading.

During the tests performed, the sequence and the mixture of the different ingredients of the formulation was detected as the most significant.

The order and method for preparing the mixture can be the following:

preparing a base mixture comprising a first gravel, for example, of quartz, silica, silica sand, glass, or mirror of sizes comprised between 0.1-2 mm and micronized powder with inorganic loads of petrographic origin, in a mixer;

stirring the mentioned mixture;

preparing a base resin selected from polyurethane, polyester, epoxy or acrylic;

adding said resin to the mentioned mixture in said mixer with a catalyst, additives and optionally pigments, and subsequent stirring;

creating a vacuum inside said mixer;

applying the mixture obtained on the substrate; and vibrating the substrate with the mixture applied on top of the same on a vibration table.

controlled supplying of thermal energy for curing of the mixture, retained on the substrate.

Referring to the preparation of the resins, if it is an acrylic resin: an acrylic resin diluted in methyl methacrylate+coupling agent of siliceous origin+air release agent+humectant (if necessary)+catalyst) can be used.

If it is a polyurethane resin: a mixture of polyisocyanates+polyol+coupling agent of siliceous origin+water capturing molecular sieve+catalyst) can be used.

And, if it is an epoxy-type resin: a resin with epoxy groups+coupling agent of siliceous origin+air release agent+accelerant (if necessary)+epoxy resin cross linking agent (amines, anhydrides, carboxylic acids, etc.) can be used.

In the laboratory tests, the components have been mixed by means of a rod stirrer and in the pilot plant tests with a screw mixer.

In a commercial operation, the components may be mixed, subjected to a vacuum, and then extruded onto a substrate using an apparatus such as the machines sold under the brand name RESPECTA® by RESPECTA Maschinenbau GmbH of Wuelfrath, Germany. When employing such an apparatus, the vacuum is applied at the end of the mixing step, continuously, while extruding the mixture.

The mixture which has been applied as a coating onto a substrate may be permitted to sit directly on the substrate prior to vibration being applied for a period of time of 45 seconds to 90 seconds, preferably 55 seconds to 65 seconds. The boards including the substrate and the coating may be retained by two opposed sides and a vibration between 300 and 1500 rpm (revolutions per minute) performed for a duration of 45 seconds to 90 seconds, providing a gravitational settling step which creates the desired concentration gradient in the applied coating.

The coating applied on the indicated artificial petrous substrate has its surface finished by a mechanical treatment which can be polishing with abrasives, polishing with brushes or sand blasting and substituted or completed by a chemical treatment of acid etching.

After the curing, a step of cutting the substrate with the consolidated coating into plates with a specific format or eventually in the form of tiles has also been provided.

Tests: Samples of Substrate with Coating Produced According to the Method

Two samples formed by respective square-shaped agglomerated stone specimens of dimensions 15×15×1.4 cm$^3$ with an applied surface hybrid polymer coating like the one described were used. The samples therefore comprise a substrate with the described consolidated coating (i.e., it is a sample with the vibrated, cured and polished mixture).

The visual study of the inorganic particle dispersion was carried out by Scanning Electron Microscopy (SEM). To perform quantitative and representative estimation of the sample, the specimen was transversely cut and micrographs were made in 6 different areas, reflecting in each case the coating/substrate interphase.

Figure 1:
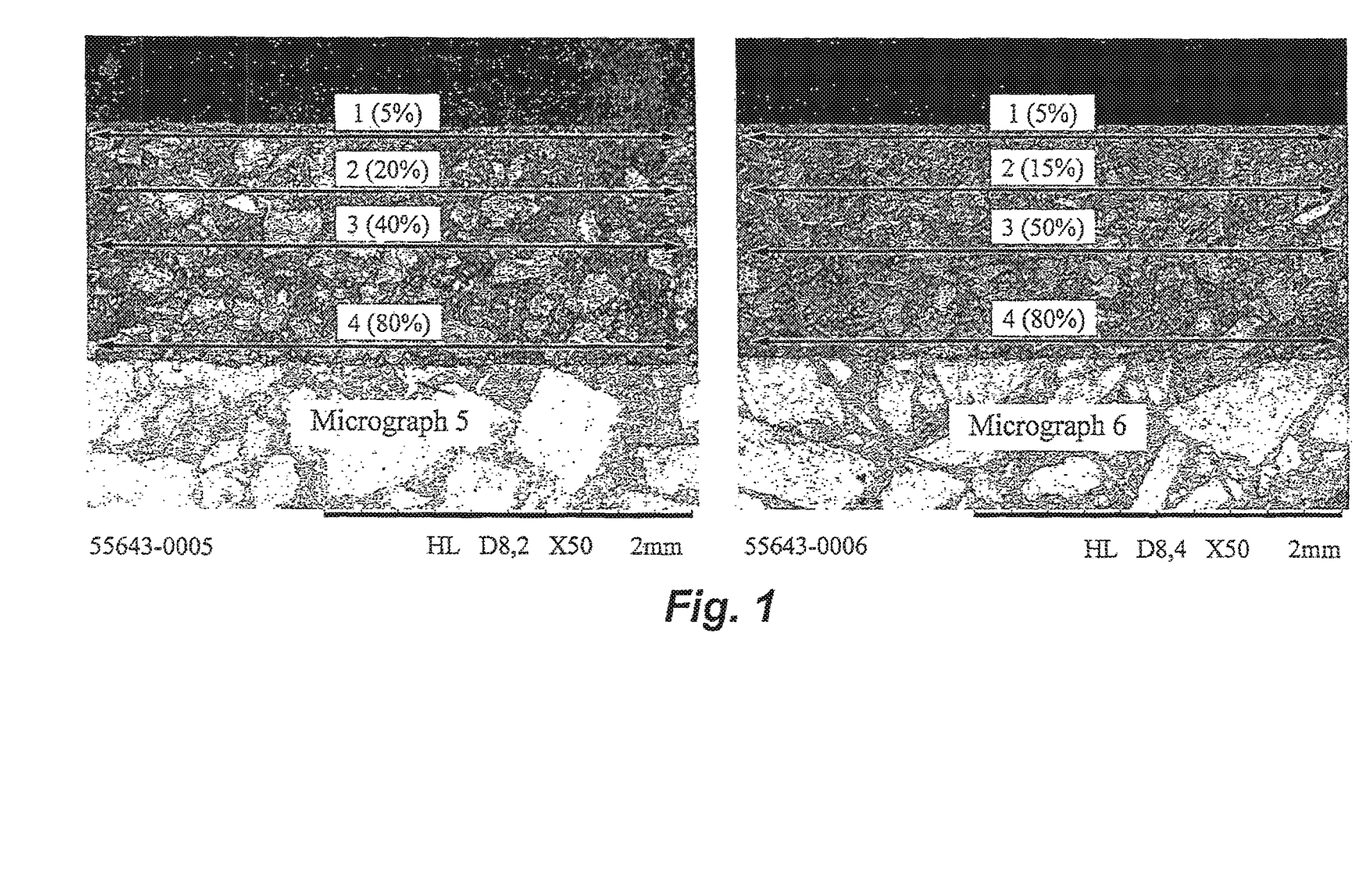
FIG. 1 is a cross section micrograph detailing the four sub-areas in which the percentage of loads (particles) was visually estimated following a standard for microscopy observation.

Then, in each micrograph four sub-areas in which the percentage of particles was visually estimated following a standard for microscopy observation (FIG. 1) were differentiated.

Figure 2:
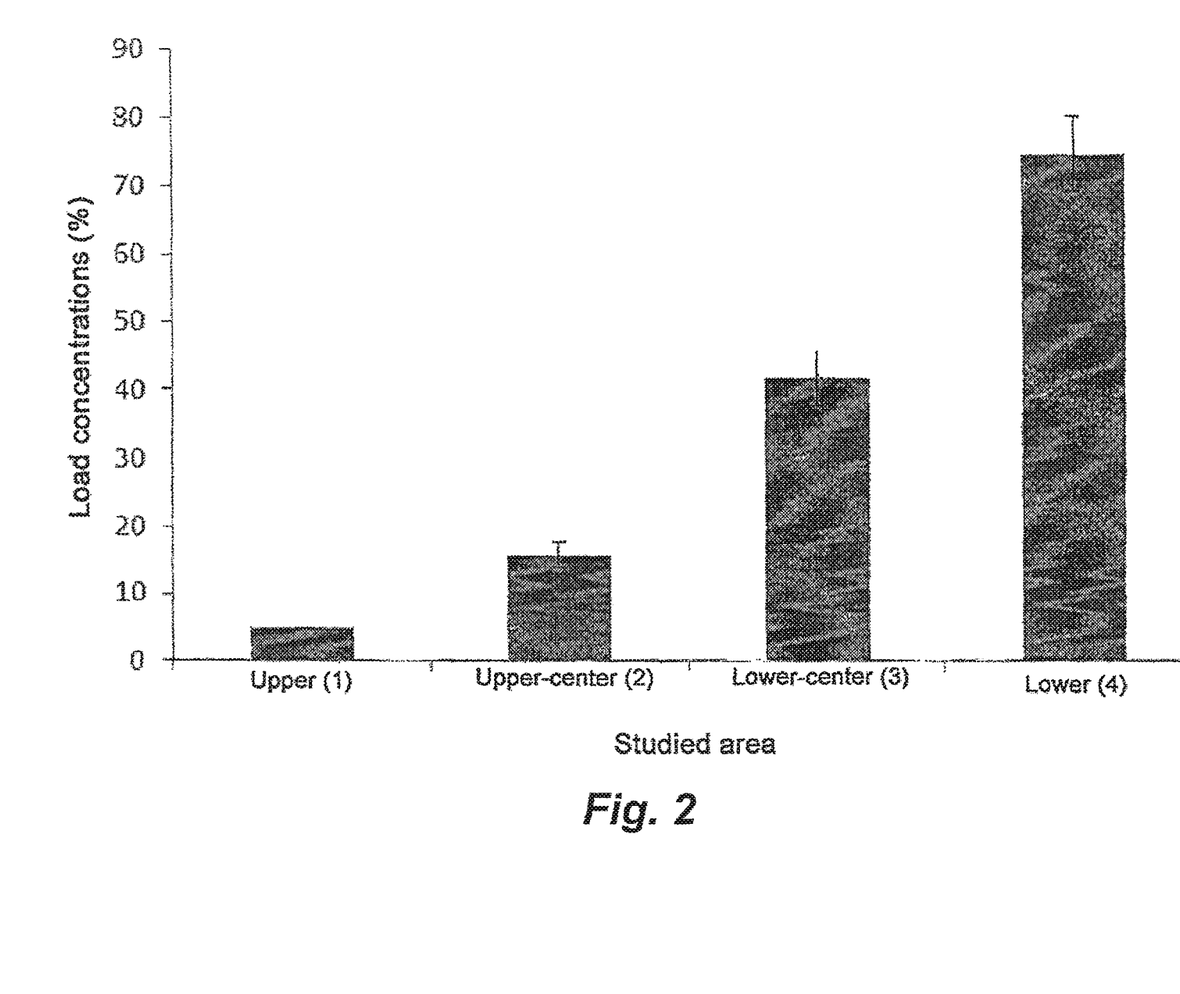
FIG. 2 is a graph indicating the percentage of loads or load concentration (index of particles) in four differentiated areas of the coating.

Generally, an increase in the accumulation of the inorganic particles is observed in the areas closest to the interphase, having in turn the largest particle sizes (estimated between 70 and 80%), although the dispersion of loads is rather homogenous. Contrarily, the area closest to the surface has lower particle index and smaller particles, estimating a load distribution between 5 and 15% (FIG. 2).

If the average results calculated from the percentage of loads for each studied area are analyzed, the existence of a tendency for the accumulation of loads towards the inner most areas of the coating (Table 1 and FIG. 2) is confirmed.

TABLE 1

Table 1: Estimation of the amount of gravel in differentiated areas

| Area | AVERAGE GRAVEL AMOUNT (%) | |
|---|---|---|
| | Vibrated sample | Non-vibrated sample |
| Upper (1) | 9 | 13 |
| Upper-center (2) | 23 | 18 |
| Lower-center (3) | 37 | 36 |
| Lower (4) | 78 | 62 |

As has been indicated above, the mixture in the form of a semi-fluid mass is distributed on the board taking advantage of its relative fluidity. In the example discussed, the board has been provided with advantageously anti-adherent side partitions retaining the mixture during the step of vibrating thereof on the board.

A further example of the preparation of a hybrid polymer coating in accordance with the present invention may be described as follows.

Step 1: A Semi-Fluid Mixture to be Applied on a Substrate is Prepared Using the Following Formula (where the Amounts Listed are in % by Weight):
Mixed Formula of Standard Granulometry

| | |
|---|---|
| Filler 1, micronized powder | 12-16% |
| Filler 2, quartz 63 microns | 12-16% |
| Filler 3, quartz 0.1/0.3 mm | 22-26% |
| Filler 4, quartz 0.3/0.6 mm | 17-21% |
| Polyester resin (accelerated with Cobalt) | 23-27% |
| Peroxide | 0.4-0.5% |
| Pigments | 0-3% |

Figure 3:
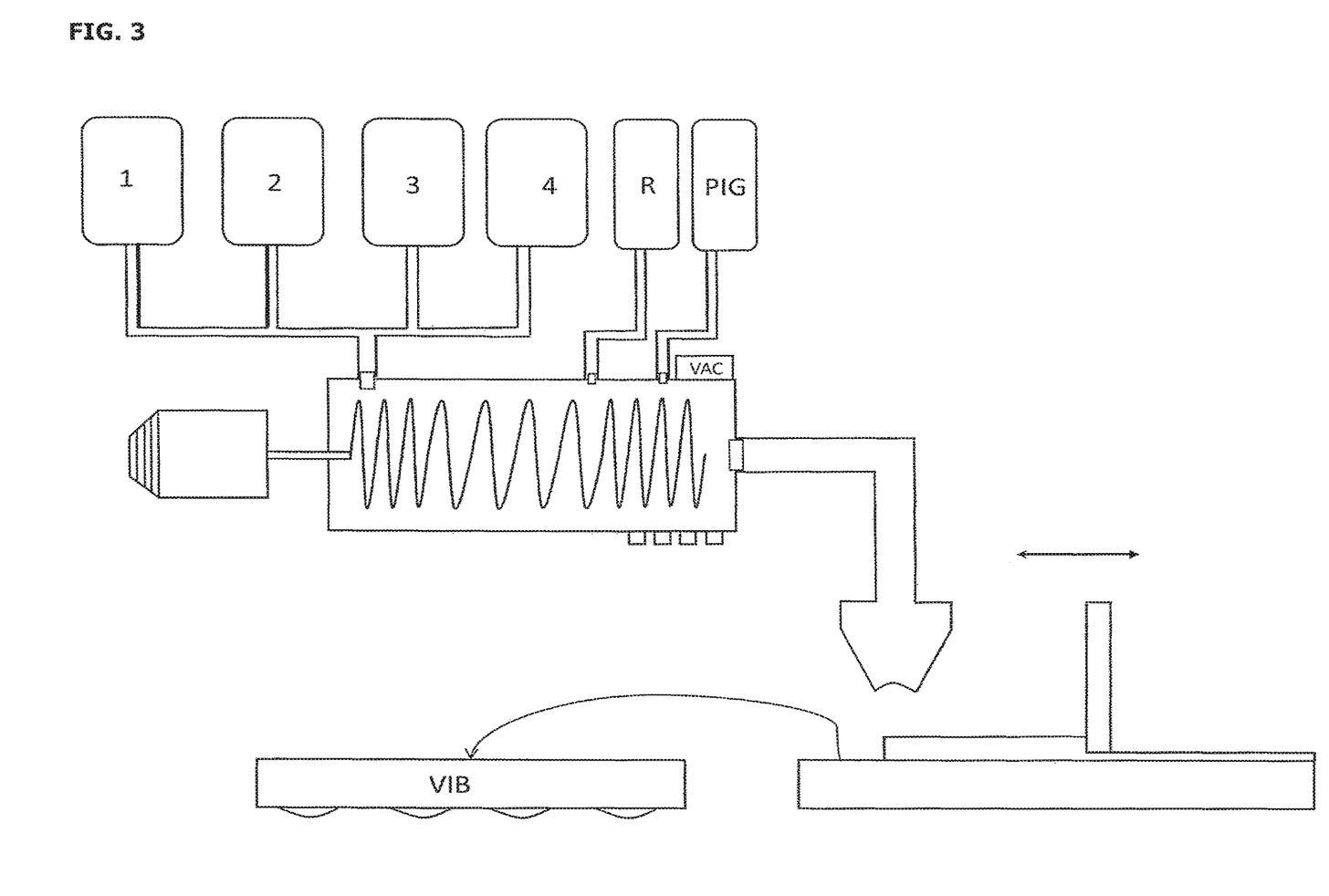
FIG. 3 is a schematic representation of an apparatus that may be used to produce a hybrid polymer coating on a petrous or ceramic substrate, in accordance with the present invention.

The mixture is prepared continuously using a Respecta™ Automated Metering and Mixing apparatus (as sold by RESPECTA Maschinenbau GmbH of Wuelfrath, Germany). FIG. 3 is a schematic representation of such an apparatus, which shows that the stirring of the mixture and the preparation of it, including a vacuum application step, is all performed inside a mixer. The peroxide is provided to the mixer along with the pigments, if any, or in substitution thereof.

Step 2: Pouring of the Semi-Fluid Mixture on the Substrate and Formation of a Uniform Layer.

Figure 4:
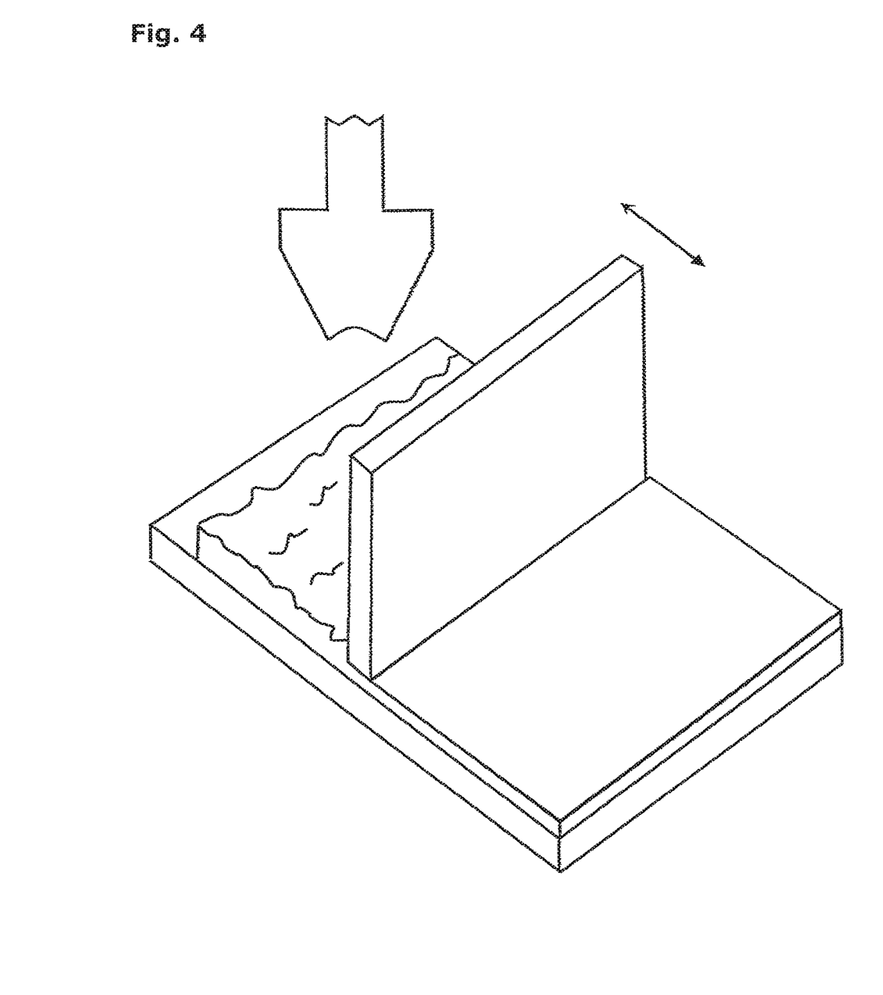
FIG. 4 is a schematic representation of a substrate (board), upon which a coating of a semi-fluid mixture has been applied using the apparatus illustrated in FIG. 3 and then leveled.

A layer of the semi-fluid mixture is poured on a substrate (board) moving on a conveyor belt and with a levelling paddle a uniform layer remains on the substrate (as shown in FIG. 4). The speed of advance of the board is between 2-4 m/min. The semi-fluid mixture is applied in step 2 in an amount of between 6 and 10 kg/min (1.8-2.4 kg/m$^2$).

Step 3: Vibration.

The boards stand on a special table, fastened by the sides. The function of the vibration is to help make the mass of the mixture easier to deaerate.

To vibrate the substrate having the semi-fluid mixture coated thereon, a pneumatic vibrator is placed under the conveyor belt of the transferring line. The pneumatic vibrator may be a Findeva K-Series Ball Vibrator, K25. This vibrator is screwed to a steel sheet that is responsible for transmitting the vibration to the conveyor belt that transports the substrate, on which the mixture has been poured and spread. A vibration of between 1500-3000 rpm (revolutions per minute) is exerted during a time of between 45 and 90 seconds.

Step 4

Accelerated curing of the semi-fluid mixture by heat.

Step 5

Finishing by a mechanical treatment.

The invention claimed is:

1. A hybrid polymer coating for petrous or ceramic substrates providing a surface layer with a thickness comprised between 0.1 and 1 mm or between 0.1 and 0.7 mm, that is directly applied on a substrate by an applicator with retention of said coating until a complete curing thereof remaining adhered firmly to said substrates, wherein said coating is prepared from a mixture with the following composition:
    10-25% by weight of micronized powder functioning as a cement with inorganic loads of petrographic origin;
    40-60% by weight of inorganic gravels of petrographic origin comprising quartz, silica or silica sand, glass, recycled mirrors, or silicon with a grain size comprised in the range of 0.063-0.6 mm;
    10-40% by weight of a polymerizable base resin selected from polyurethane, polyester, epoxy or acrylic, and
    approximately 5% by weight of pigments and other additives for said resin including a catalyst;
    wherein said inorganic gravels and micronized powder form a concentration gradient in the coating, so that in three areas of said applied coating having the same thickness the proportion of said gravel and micronized powder with respect to the thickness of the coating is the following:

in a lower third of the coating corresponding to the first inner most area at the interphase between the coating and the surface of the petrous or ceramic substrate said gravel and micronized powder are in the range between 55%-90% by weight;

in a middle third of the coating said gravel and micronized powder are in the range between 16%-60% by weight; and in an upper third of the coating close to the visible surface of the coating said gravel and micronized powder are in the range between 1%-15% by weight, and wherein the hybrid polymer coating enabling the use of defective or damaged slabs of marble agglomerate or substrates of a minimum thickness of 4-6 mm by applying the mentioned coating.

2. The coating according to claim 1, wherein said micronized powder is of siliceous materials comprising quartz, silicon, cristobalite and/or glass, of aluminum oxides or of calcareous materials.

3. The coating according to claim 1, wherein the mentioned mixture comprises gravels of different nature and grading.

4. The coating according to claim 1, further comprising a polished surface having a hardness greater than 5 Mohs.

5. A petrous or ceramic substrate with an hybrid polymer coating directly applied on a visible surface thereof by an applicator with retention of said coating until a complete curing thereof remaining adhered firmly to the substrate wherein said coating is prepared from a mixture with the following composition:

10-25% by weight of micronized powder functioning as a cement with inorganic loads of petrographic origin;

40-60% by weight of inorganic gravels of petrographic origin comprising quartz, silica or silica sand, glass, recycled mirrors, or silicon with a grain size comprised in the range of 0.063-0.6 mm;

10-40% by weight of a polymerizable base resin selected from polyurethane, polyester, epoxy or acrylic, and approximately 5% by weight of pigments and other additives for said resin including a catalyst;

wherein said inorganic gravels and micronized powder form a concentration gradient in the coating, so that in three areas of said applied coating having the same thickness the proportion of said gravel and micronized powder with respect to the thickness of the coating is the following:

in a lower third of the coating corresponding to the first inner most area at the interphase between the coating and the surface of the petrous or ceramic substrate said gravel and micronized powder are in the range between 55%-90% by weight;

in a middle third of the coating said gravel and micronized powder are in the range between 16%-60% by weight; and in an upper third of the coating close to the visible surface of the coating said gravel and micronized powder are in the range between 1%-15% by weight.

* * * * *